(12) United States Patent
Fraenkel (10) Patent No.: US 9,305,111 B1
(45) Date of Patent: Apr. 5, 2016

(54) SYSTEM AND METHOD OF PERFORMING QUANTITATIVE ANALYSIS VIA GRAPH NODES REPRESENTING PROGRAMS

(71) Applicant: UBS AG, Zurich (CH)

(72) Inventor: Peter N. Fraenkel, New York, NY (US)

(73) Assignee: UBS AG, Zurich (CH)

( * ) Notice: Subject to any disclaimer, the term of this patent is extended or adjusted under 35 U.S.C. 154(b) by 321 days.

(21) Appl. No.: 13/861,040

(22) Filed: Apr. 11, 2013

(51) Int. Cl.
*G06F 17/00* (2006.01)
*G06F 17/30* (2006.01)
*G06F 17/27* (2006.01)
*G06Q 10/06* (2012.01)

(52) U.S. Cl.
CPC ...... *G06F 17/30958* (2013.01); *G06F 17/2785* (2013.01); *G06Q 10/067* (2013.01)

(58) Field of Classification Search
CPC ..... G06Q 10/067; G06F 17/2785; G06N 5/02
USPC ......................... 706/12, 45, 47, 62
See application file for complete search history.

(56) References Cited

U.S. PATENT DOCUMENTS

| 5,809,212 | A | 9/1998 | Shasha | |
|---|---|---|---|---|
| 7,698,343 | B2 * | 4/2010 | Anderson et al. | 707/756 |
| 8,631,068 | B1 * | 1/2014 | Jannink et al. | 709/204 |
| 2003/0229605 | A1 | 12/2003 | Herrera et al. | |
| 2005/0289168 | A1 | 12/2005 | Green et al. | |
| 2006/0161814 | A1 | 7/2006 | Wocke et al. | |
| 2007/0266144 | A1 * | 11/2007 | Bollen et al. | 709/224 |
| 2008/0059563 | A1 | 3/2008 | Bachmann et al. | |
| 2008/0281801 | A1 * | 11/2008 | Larson et al. | 707/4 |
| 2011/0320496 | A1 * | 12/2011 | Reid et al. | 707/797 |
| 2012/0109842 | A1 * | 5/2012 | Bhatt et al. | 705/333 |
| 2012/0130932 | A1 | 5/2012 | Veanes et al. | |
| 2012/0197900 | A1 | 8/2012 | Mandre | |
| 2012/0304172 | A1 | 11/2012 | Greifeneder et al. | |
| 2013/0066823 | A1 * | 3/2013 | Sweeney et al. | 706/50 |

OTHER PUBLICATIONS

Luke et al., Evolving Graphs and Networks with Edge Encoding: Preliminary Report, 1996, Papers of the Genetic Programming, Jul. 1996, pp. 1-8.*
Artificial Intelligence, 27, 1985, pp. 97-109, "Depth-First Iterative-Deepening: An Optimal Admission Tree Search."
Final Office Action issued for U.S. Appl. No. 13/797,472 dated Oct. 6, 2015.

* cited by examiner

*Primary Examiner* — David Vincent (74) *Attorney, Agent, or Firm* — Pillsbury Winthrop Shaw Pittman LLP (57) ABSTRACT

Quantitative analysis is provided through the implementation of a graph that includes nodes having edges therebetween representing data dependencies between the nodes. The nodes include calculation objects such as programs, data, libraries, and/or other objects. The nodes provide for modular computation that provides for transparency, record-keeping, experimentation, and/or other functionalities.

28 Claims, 6 Drawing Sheets

SYSTEM AND METHOD OF PERFORMING QUANTITATIVE ANALYSIS VIA GRAPH NODES REPRESENTING PROGRAMS

RELATED APPLICATIONS

This application is related to, and incorporates herein by reference in their entirety, U.S. patent application Ser. No. 13/797,472, filed Mar. 12, 2013, and entitled "System And Method Of Performing Modular Quantitative Analysis With Nodes That Have Temporality" and U.S. patent application Ser. No. 13/797,646, filed Mar. 12, 2013, and entitled "System And Method Of Performing Modular Quantitative Analysis With Nodes That Have Contextual Labels."

FIELD

The disclosure relates to an analytical system and method that implements a graph comprising script nodes and data nodes to provide for efficient modular computation.

BACKGROUND

Within the finance industry, the risk management of positions in derivatives securities provides a technological challenge. Conventional solutions have focused on providing powerful enough analytical tools to derive the value of securities from the prices of the instruments on which they depend. These solutions have provided mathematical models for behavior of these prices. Such calculations tend to involve computational intensive Monte Carlo techniques, and valuing an individual derivative security may take anywhere from seconds to hours.

SUMMARY

One aspect of the disclosure relates to a system configured to perform quantitative analysis. The system may comprise one or both of non-transitory storage media and/or one or more processors. The non-transitory storage media stores a graph comprising nodes used in the performance of calculations, the nodes including a first node, a second node, and a third node, the nodes being identified by keys that include node identifiers, contextual label collections, and temporal identifiers that reflect points of interest in time such that: the first node is identified by a first key that includes a first node identifier, a first contextual label collection, and a first temporal identifier, the second node is identified by a second key that includes a second node identifier, a second contextual label collection, and a second temporal identifier, and the third node is identified by a third key that includes a third node identifier, a third contextual label collection, and a third temporal identifier. The storage media further stores dependencies between nodes that indicate specific nodes used in the creation of other nodes such that, responsive to the first node being used in the creation of the second node, the first node is a dependency of the second node, the dependency of the second node on the first node is stored to the storage media. Information stored to the storage media reflects transitive dependencies between nodes such that, responsive to the third node being used in the creation of the first node, the third node is a transitive dependency of the second node, the transitive dependency of the second node on the third node is reflected in the information stored to the storage media. Edges in the graph represent dependencies between the nodes such that an edge between the first node and the second node represents that the first node is a dependency of the second node. The one or more processors configured to identify nodes that satisfy queries to the graph based on the node identifiers, the contextual label collections, and the temporal identifiers included in the keys of the nodes such that identification of the second node as satisfying a first query is based on the second contextual label collection and the second temporal identifier included in the second key.

Another aspect of the disclosure relates to a computer-implemented method of performing quantitative analysis. The method comprises storing, to non-transitory storage media, a graph comprising nodes used in the performance of calculations, the nodes including a first node, a second node, and a third node, the nodes being identified by keys that include node identifiers, contextual label collections, and temporal identifiers that reflect points of interest in time such that: the first node is identified by a first key that includes a first node identifier, a first contextual label collection, and a first temporal identifier, the second node is identified by a second key that includes a second node identifier, a second contextual label collection, and a second temporal identifier, and the third node is identified by a third key that includes a third node identifier, a third contextual label collection, and a third temporal identifier, the storage media further storing dependencies between nodes that indicate specific nodes used in the creation of other nodes such that, responsive to the first node being used in the creation of the second node, the first node is a dependency of the second node, the dependency of the second node on the first node being stored to the storage media, wherein information stored to the storage media reflects transitive dependencies between nodes such that, responsive to the third node being used in the creation of the first node, the third node is a transitive dependency of the second node, the transitive dependency of the second node on the third node being reflected in the information stored to the storage media; wherein edges in the graph represent dependencies between the nodes such that an edge between the first node and the second node represents that the first node is a dependency of the second node; and identifying the second node as satisfying a first query based on the second contextual label collection and the second temporal identifier included in the second key.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
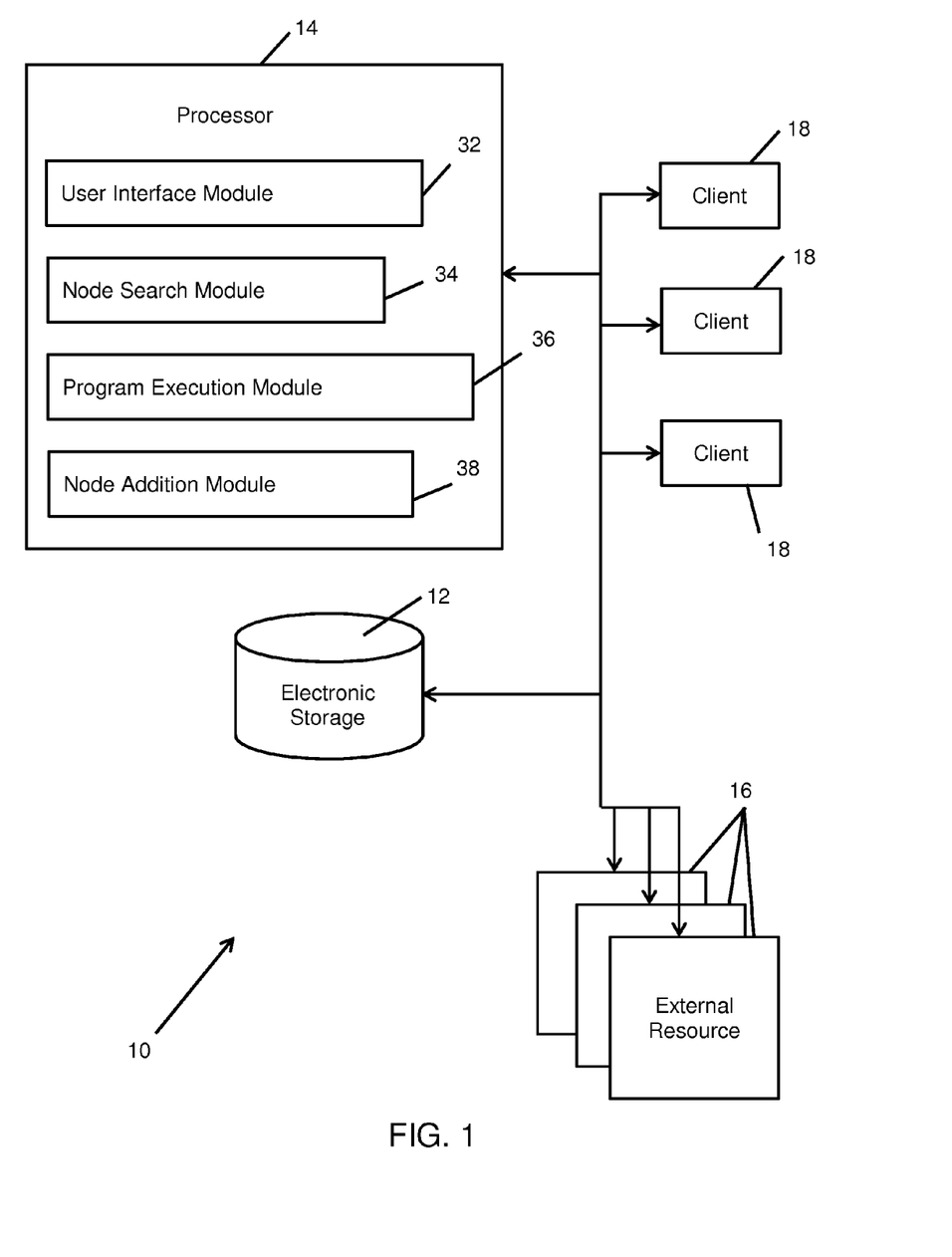
FIG. 1 illustrates a system configured to perform quantitative analysis.

FIG. 1 illustrates a system 10 configured to perform analysis. System 10 may be configured to manage analytic resources in a manner that may provide one or more enhancements over conventional analytic systems. Such enhancements may include one or more of performing memoization, reducing redundancy, providing for efficient deployment of processing, storage, and/or communication resources, preserving a computational record to facilitate recreation of previously performed analytics, and/or other enhancements. System 10 may implement a graph having nodes used in the performance of calculations, and edges representing relationships between the nodes. The graph may be directed, acyclic, and/or have other properties. The nodes in the graph may be updateable, retrievable, and/or have other properties or features that enhance operation of system 10. In some implementations, system 10 may include one or more of electronic storage 12, one or more processors 14, external resources 16, one or more client computing platforms 18, and/or other components.

The various components of system 10 may be configured for electronic communication therebetween. Such communication may be accomplished via one or more networks, one or more direct connections, one or more wireless connections, one or more wired connections, and/or other electronic communication media. One or more of the components of system 10 may be implemented in a server (not shown). The server may be in communication with client computing platforms 18 via a client/server architecture to provide access to users of system 10 via client computing platforms 18.

Electronic storage 12 stores the nodes of the graph. The nodes are used in the performance of calculations, and include calculation objects. A calculation object may include one or more of a program, a reference to an external resource, a library, and/or other information to be used and/or to record the result of a calculation. A program may refer to a set of information configured to cause one or more processors to execute commands or instructions specified by the set of information. A program may be compiled (or may require compiling), and/or may be uncompiled (e.g., a script and/or other uncompiled programs). A program may include one or more of source code, object code, machine code, and/or other types of code. Data may include information generated by a previous calculation (e.g., a result of a calculation and/or other information), information dictated by a market or controlling body (e.g., an interest rate), a statistic, and/or other information. Data may reflect real world variable at a specific time, and/or may reflect speculation about what a real world variable was, is, and/or will be at some time. A reference to an external resource may specify a location (e.g., a network location or address) at which the external resource can be accessed. The reference may cause a query to be generated for the external resource. The external resource may include one or more of a program, data, a library, and/or other resources. A library may include a collection of implementations of behavior, may be written in terms of a language, may have a well-defined interface by which the behavior is invoked, and/or may have other properties. Libraries may differ from programs in that a library may be organized in such a way that it can be used by multiple programs which may have no connection to each other, while code that is part of a program is organized to only be used within that one program.

Nodes in the graph are identified by keys. A key of a node may include one or more of a node identifier, one or more parameters, a set of parameter values, a contextual label collection, a temporal identifier, and/or other information. The contextual label collection includes one or more contextual labels that are specified for the node at the time that the node is created. The contextual labels correspond to contexts in which sets of nodes exist. The contextual labels in the contextual label collection may be ordered within the contextual label collection in a manner that dictates how the node is used to satisfy future queries. The temporal identifier of the node reflects one or more points in time of interest for the node. The temporal identifier may reflect one or more of an entry time, a relevant time, and/or other times. The entry time of the node may be a point in time at which the script node was added to the graph and/or stored to electronic storage 12. The relevant time of the node may be a point in time for which the node is relevant. The point in time for which the node is relevant may be referred to as an "as-at" time.

Figure 2:
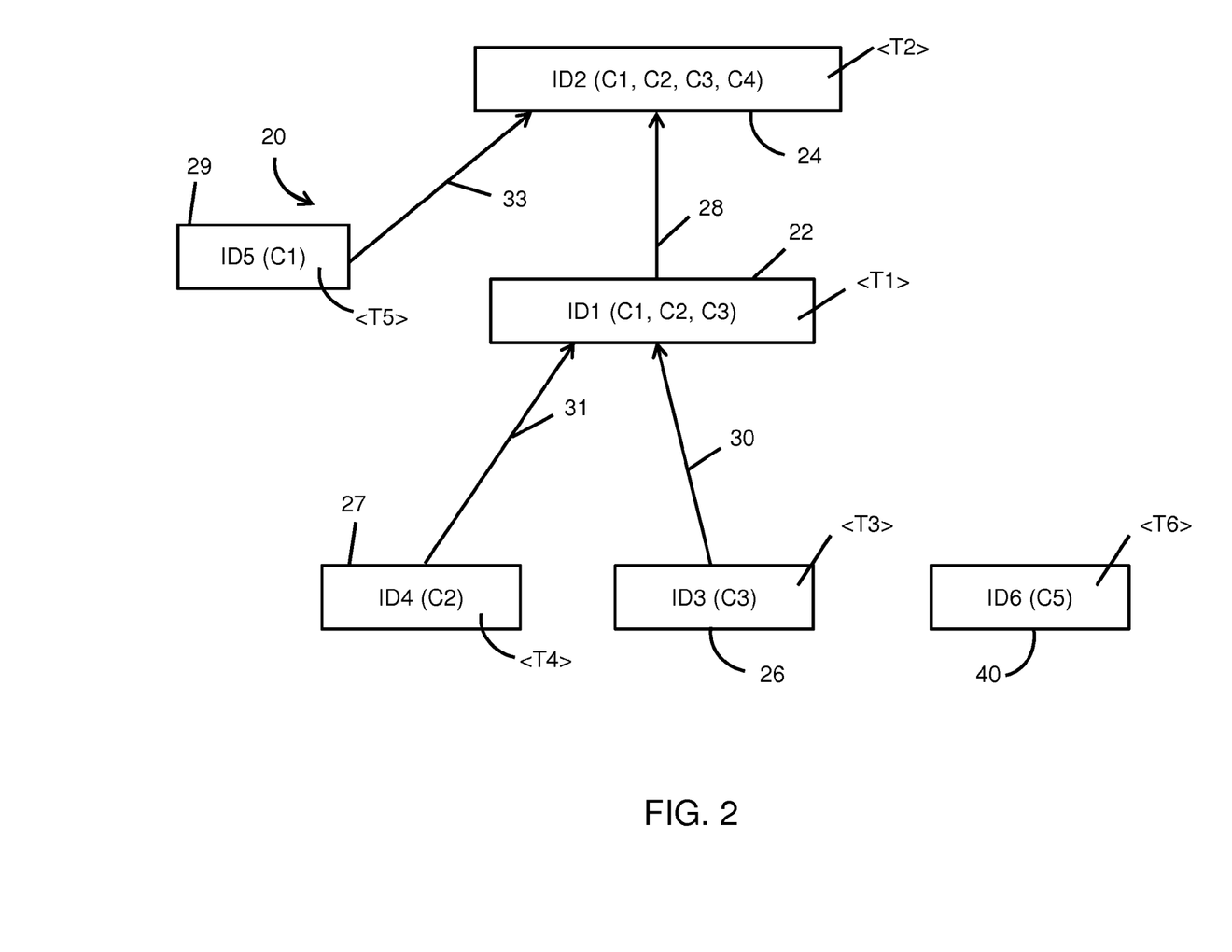
FIG. 2 illustrates a graph of nodes for implementation in quantitative analysis.

The edges in the graph represent dependencies between the nodes. The dependencies indicate specific nodes used in the creation of other nodes. By way of non-limiting example, FIG. 2 illustrates a graph 20. Graph 20 includes a first node 22, a second node 24, a third node 26, a fourth node 27, a fifth node 29, and/or other nodes (not shown in FIG. 2). First node 22 is identified by a first key that includes a first node identifier (ID1). Second node 24 is identified by a second key that includes a second node identifier (ID2). Third node 26 is identified by a third key that includes a third node identifier (ID3). Fourth node 27 is identified by a fourth key that includes a fourth node identifier (ID4). Fifth node 29 is identified by a fifth key that includes a fifth node identifier (ID5). In graph 20, a first edge 28 between first node 22 and second node 24 represents that first node 22 was used in the creation of second node 24, making first node 22 a dependency of second node 24. A second edge 30 between third node 26 and first node 22 represents that third node 26 was used in the creation of first node 22, making third node 26 a dependency of first node 22. A third edge 31 between fourth node 27 and first node 22 represents that fourth node 27 was used in the creation of first node 22, making fourth node 27 a dependency of first node 22. Since second node 24 has a dependency on first node 22, and first node 22 has a dependency on third node 26 and a dependency on fourth node 27, second node 24 has a "transitive dependency" on third node 26 (or third node 26 is a transitive dependency of first node 22), and second node 24 has a transitive dependency on fourth node 27. Fifth node 29 is also a dependency of second node 24, as denoted by a fourth edge 33.

Although the first node identifier, the second node identifier, the third node identifier, the fourth node identifier, and the fifth node identifier are represented as having wholly different values in FIG. 2, this is not intended to be limiting. Two or more of nodes 22, 24, 26, 27, and/or 29 shown in FIG. 2 may have node identifiers with the same value, or such that one of the node identifiers is a variant of one of the other node identifiers. For example, if third node 26 includes a program, and first node 22 includes a result of a calculation performed by the program, the third node identifier and the first node identifier may be the same, or may be variants of each other that indicate one node includes a program and/or the other node includes a result of a calculation.

Queries to the graph can be satisfied using nodes including results of previous calculations by the programs in other nodes, rather than re-executing the programs. This re-use of results may reduce duplicative use of processing resources, communication resources, and/or other resources. The storage of dependencies and transitive dependencies between the nodes creates a record that reflects not only the relationships between nodes including programs and nodes including results of the programs, but also indicates for a given node, which includes a result of a calculation, all (or substantially all) of the specific calculation objects (e.g., programs, data, libraries, etc.) used in the calculation of the result in the given node. This memoization and record-keeping not only reduces duplicative use of resources, but also facilitates auditing of individual results by analysis of dependencies and transitive dependencies.

Referring back to FIG. 1, electronic storage 12 comprises non-transitory electronic storage media that electronically stores information. Electronic storage 12 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 12 may include virtual storage resources, such as storage resources provided via a cloud and/or a virtual private network. Electronic storage 12 may store software algorithms, information determined by processor 14, information received via client computing platforms 18, and/or other information that enables system 10 to function properly. Electronic storage 12 may be a separate component within system 10, or electronic storage 12 may be provided integrally with one or more other components of system 12 (e.g., processor 14).

Processor 14 is configured to provide information processing capabilities within system 10. Processor 14 is configured to execute one or more of a user interface module 32, a node search module 34, a program execution module 36, a node addition module 38, and/or other modules.

User interface module 32 is configured to define a user interface for presentation to users of system 10. The user interface provides access to system 10 for the users. The user interface may include a graphical user interface and/or other user interfaces presented to the users via client computing platforms 18. The definitions of the user interfaces may be communicated to client computing platforms 18 from processor 14. The user interface is configured to receive entry and/or selection of queries to system 10. The queries may include one or more of queries for results of calculations performed by nodes, updates to nodes, and/or other queries. The user interface is configured to present results of queries. The results may include results of calculation provided by nodes, and/or other results.

A query may include specified information that facilitates identification of a node that corresponds to the query. Specified information may include information found in the keys of the nodes. For example, specified information may include one or more of a specified node identifier, one or more specified parameters, one or more specified parameter values, a specified contextual label collection, a specified temporal identifier, and/or other information. Specified information may be used to identify the node(s) that satisfy a query.

Node search module 34 is configured to identify nodes that satisfy queries based on keys identifying the nodes, the values of the nodes, and/or other information. The values of the nodes may include one or more of dependencies of the nodes (and/or keys of the dependencies), transitive dependencies of the nodes (and/or keys of the transitive dependencies), information included in the nodes, and/or other values of the nodes. For example, referring back to graph 20 in FIG. 2, identification of second node 24 as satisfying a first query may be based on the second key and further based on the first key and the fifth key by virtue of the dependency of second node 24 on first node 22 and fifth node 29. Such identification of second node 24 as satisfying the first query may still further be based on the third key and the fourth key by virtue of the transitive dependency of second node 24 on third node 26 and fourth node 27.

Returning to FIG. 1, node search module 34 may be configured to identify nodes that satisfy queries to the graph based on the collections of contextual labels included in the keys. This may include performing searches for nodes having collections of contextual labels that correspond to a specified collection of contextual labels in a query in the process of identifying a node that satisfies the query. A contextual label collection that corresponds to the specified collection of contextual labels may be the same as the specified contextual label collection, or may be the same as a modified version of the specified contextual label collections if no suitable nodes include the full specified contextual label collection. The specified contextual label collection may be modified to determine the modified version of the specified contextual label collection in a predetermined and/or iterative manner, as is discussed herein. The implementation of the contextual label collections may facilitate substitution of various calculation objects in determining results of calculations without permanently modifying nodes including the calculation objects that are being substituted, and/or without requiring duplication of nodes including calculation objects that are not being substituted. This may enhance customizability, experimentation, trouble-shooting, recreation of previous calculations, and/or provide other enhancements. Further description of the manner in which node search module 34 may search for a node having a contextual label collection that corresponds to a specified contextual label collection in a query is provided with respect to the description of FIG. 4, which appears below.

Node search module 34 may be configured to identify nodes that satisfy queries to the graph based on the temporal identifiers included in the keys. This may include considering entry times, relevant times, and/or other times reflected in the temporal identifiers of the nodes and/or their dependencies and transitive dependencies. Implementation of the temporal identifiers in satisfying a query may facilitate performing calculations based on data that speculates about the future, obtaining results of calculation based on a previous state, facilitate updating of calculation objects like programs, data, libraries and/or other calculation objects in the graph while at the same time making the previous versions of the calculation objects available upon request, and/or may facilitate other functionality. Further description of the manner in which node search module 34 may search for a node having a temporal identifier that corresponds to a specified temporal identifier in a query is provided with respect to the description of FIG. 4 below.

By way of illustration, returning to FIG. 2, the first key includes a first contextual label collection (C1, C2, C3) and a first temporal identifier <T1>, the second key includes a second contextual label collection (C1, C2, C3, C4) and a second temporal identifier <T2>, the third key includes a third contextual label collection (C3) and a third temporal identifier <T3>, the fourth key includes a fourth contextual label collection (C2) and a fourth temporal identifier <T4>, and the fifth key includes a fifth contextual label collection (C1) and a fifth temporal identifier <T5>. Graph 20 is further depicted as including a sixth node 40. Sixth node 40 is identified by a sixth key that includes a sixth node identifier (ID6), a sixth contextual label collection (C5), and a sixth temporal identifier <T6>. The sixth node identifier may be the same as the fourth node identifier. By way of non-limiting example, in graph 20, if the first query includes a specified contextual label collection of (C1, C2, C3, C4, C5) and a specified temporal identifier, identification of second node 24 as satisfying the first query is based on the second contextual label collection corresponding to the specified contextual label collection in the first query and the second temporal identifier corresponding to the specified temporal identifier.

Identification of second node 24 as satisfying the first query may be based on the fifth contextual label collection and the fifth temporal identifier by virtue of the dependency of second node 24 on fifth node 29, based on the first contextual label collection and the first temporal identifier by virtue of the dependency of second node 24 on first node 22, based on the third contextual label collection and the third temporal identifier by virtue of the transitive dependency of second node 24 on third node 26, and/or based on the fourth contextual label collection and the fourth temporal identifier by virtue of the transitive dependency of second node 24 on fourth node 27.

Returning to FIG. 1, node search module 34 may be configured such that upon receipt of a query for results of a computation, a search is first performed for a node including the result requested by the query. Responsive to there being no node including a result that satisfies the query, a search may be performed for a node including a program configured to effectuate performance of the computation to produce the result requested by the query. In some implementations, nodes including results of computations previously performed may be identified by keys that include node identifiers that are variants of node identifiers of nodes that include the programs that produced the results of the computations. In such implementations, node search module 34 may be configured to first perform search for a node having a node identifier that matches the specified node identifier from the query, and then to search a variant of the specified node identifier for a node including a program that would produce a result having the specified node identifier.

By way of illustration, returning to FIG. 2, assuming third node 26 includes a program and that first node 22 includes a result of a computation performed by the program of third node 26, the third node identifier may be a variant of the first node identifier. For example, a second query to graph 20 may be looking for a result of a calculation performed by the program included in third node 26 that uses a calculation object included in sixth node 40, rather than the calculation object included in fourth node 27, during execution of the program. To specify this, the second query may include a specified node identifier that corresponds to the first node identifier, a specified contextual label collection that corresponds to the sixth contextual label collection and the third contextual label collection, and a specified temporal identifier that corresponds to the sixth temporal identifier. Such a specified contextual label collection may include, for example, (C3, C5). In response to the second query, it may be determined that none of the nodes in graph 20 satisfies the second query. Then, the second query may be modified and graph 20 may be re-searched for the modified query. The modified query may be configured to request a node having the program that will generate the result requested in the second query. This may include modifying the specified node identifier to the variant of the specified node identifier that matches the third node identifier. The modified query may be satisfied by third node 26. However, since third node 26 includes a program, and not a result of a previous computation, the program may need to be executed to satisfy the second query, with the generated result providing the result that would satisfy the second query (e.g., using the calculation object in sixth node 40 instead of the calculation object in fourth node 27).

Returning to FIG. 1, program execution module 36 is configured to effectuate execution of programs included in nodes. This may include actually executing the programs, requesting or managing execution of the programs on a distributed computing system (e.g., a computing grid, and/or other distributed systems), and/or effectuating execution in other ways. Program execution module 36 may effectuate execution of a program included in a node responsive to the node being identified by node search module 34 as including a program configured to effectuate computation of a result requested by a query. The execution of such a program would generate output from the node including the program that includes the result requested by the query. Program execution module 36 is further configured such that the output from the node including the program further includes the dependencies of the result generated by the program, including a dependency on the node generating the output, and any other nodes on which the execution of the program relied.

Node addition module 38 is configured to add nodes to the graph. This includes adding nodes to the graph including results generated by the programs in the nodes. For example, responsive to node search module 34 identifying a node including a program as satisfying a query, and further responsive to program execution module 36 executing the program and producing output from the identified node (including the result requested by the query), node addition module 38 adds a node to the graph that includes the output from the identified node. The newly added node includes the result requested by the query. Node addition module 38 may also store the dependencies of the newly added node (which are the dependencies indicated in the output of the identified node), and/or other information.

The key of the newly added node is determined by node addition module 38 based on one or more of information specified in the query, information included in the key of the node identified by node search module 34, and/or information included in the keys of dependencies indicated in the results of the identified node (which are now the dependencies of the newly added node). For example, a node identifier in the key of the newly added node may match the specified node identifier in the unmodified second query. A contextual label collection of the newly added node may be determined based on the specified contextual label collection in the second query (e.g., they may match). A temporal identifier of the newly added node may be determined based on the dependencies and/or transitive dependencies of the newly added node. For example, a parameter of the temporal identifier, such as relevant time and/or other parameters, of the newly added node may match an infimum (e.g., most recent time) of the same parameter in temporal identifiers of the dependencies and/or transitive dependencies of the newly added node. A parameter of the temporal identifier, such as entry time, may reflect a point in time at which the newly added node was added to the graph. Other components of the key of the newly added node may correspond to information specified in the second query and/or keys of its dependencies. These components may include, for example, parameters, parameter values, and/or other components.

Figure 3:
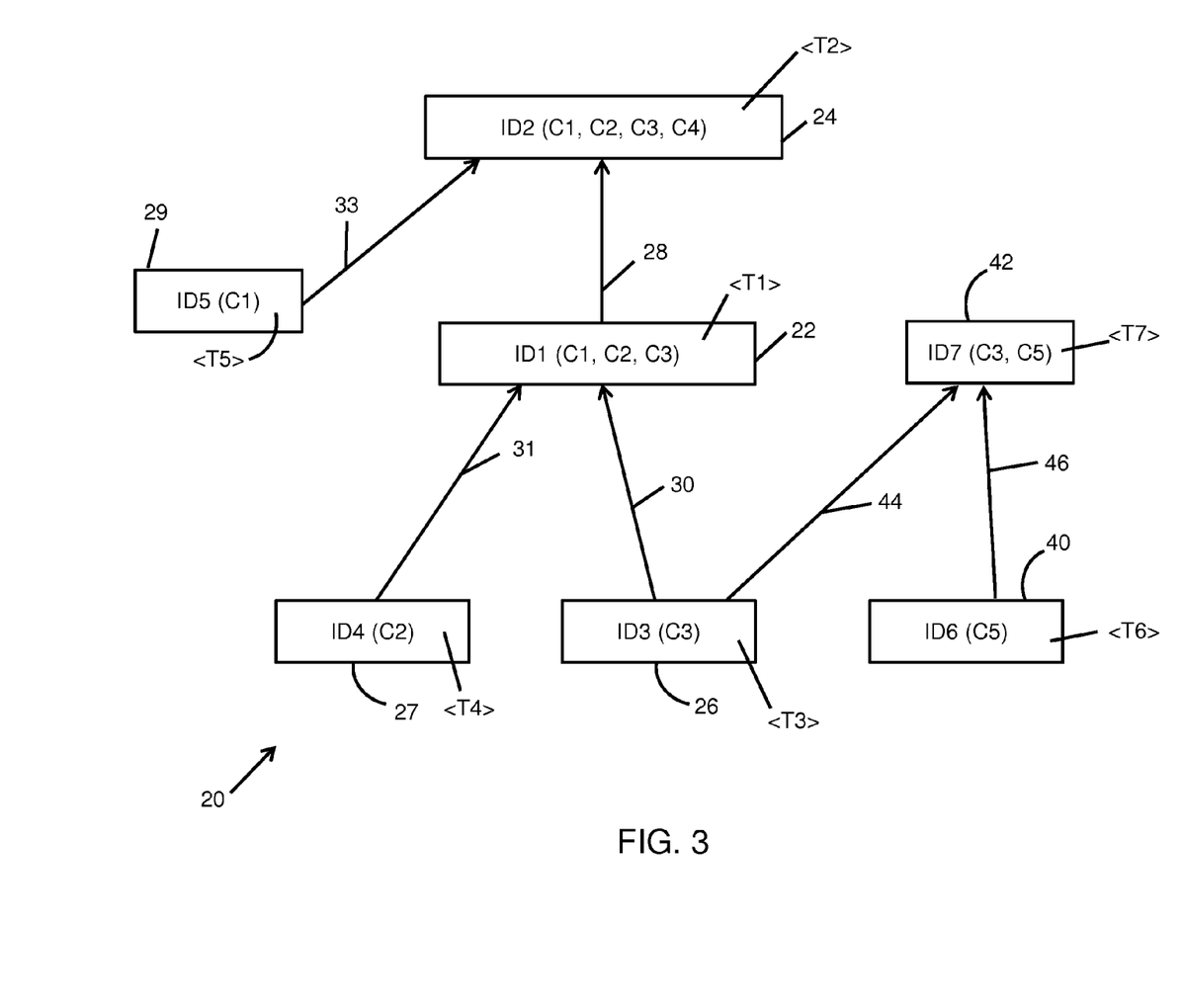
FIG. 3 illustrates a graph of nodes for implementation in quantitative analysis

By way of illustration, FIG. 3 depicts graph 20 subsequent to the second query which was satisfied by third node 26 and caused the program included in third node 26 to be executed using the calculation object in sixth node 40. The execution of the program in third node 26 generates an output from third node 26 that is added to graph 20 as a seventh node 42. Seventh node 42 includes the result of the execution of the program. Seventh node 42 is identified by a seventh key. The seventh key includes a seventh node identifier (ID7), a seventh contextual label collection (C3, C5), a seventh temporal identifier <T7>, and/or other information. The seventh node identifier may be the same as the first node identifier and/or may be based on the third node identifier by virtue of seventh node 42 including a result of the program included in third node 26 (e.g., the third node identifier may be a variant of the first node identifier). A fifth edge 44 in graph 20 represents the dependency of seventh node 42 on third node 26. The seventh contextual label collection may be determined based on the specified contextual label collection. For example, the seventh contextual label collection may match the specified contextual label collection. The seventh temporal identifier may be determined based on the temporal identifiers of the dependencies of the seventh node. For example, the seventh temporal identifier may represent a time that is the infimum of times represented by the temporal identifiers of the dependencies of the seventh node.

As discussed herein, in some cases, a program, when executed, generates a further query to graph 20. Such queries may request, for example, data, a result of a previous computation, a library (and/or functionality associated therewith), and/or other calculation objects. For example, in FIG. 3, execution of the program included in third node 26 generated a further query that was satisfied by sixth node 40. By virtue of the further query satisfied by sixth node 40, and the reliance of the program in third node 26 on the calculation object in sixth node 40, seventh node 42 has a dependency on sixth node 40, which is stored and is reflected in graph 20 as a sixth edge 46.

In some implementations, exceptions may be made from the description above with respect to FIG. 3 in queries generated by a program. A program may be specifically created to generate a query that does not include the original specified collection of contextual labels. For example, the query may be generated instead with the original specified collection of contextual labels, but without the last contextual label in the specified collection of contextual labels. This may be useful in cases where a program is used to perturb another calculation object (e.g., information, data, and/or other objects) or a result of the execution of a calculation object (e.g., a program). Perturbing another calculation object, or the result of a calculation object may obviate the need for entering a series of perturbed and unperturbed calculation objects in separate nodes to the graph. For example, rather than relying on a series of different programs that differently perturbed a result of a calculation, a single program may be entered and the perturbations may be accomplished through a second program that can perform the perturbations. The second program may be included in a node that has a contextual label collection with a last (or only) contextual label that is not included in queries generated by the second program.

A use case may include a program that produces a yield curve and a perturbing program that shifts the resulting yield curve, rather than an another program that produces a shifted yield curve from scratch. In such implementations, the yield curve program may be included in a yield curve node associated with the collection of contextual labels (C3), and the perturbation program may be included in a perturbation node associated with the collection of contextual labels (C4). The identifier associated with the perturbation node may be the same as the identifier associated with the yield curve node. A query specifying the common identifier, and the collection of contextual labels (C1, C2, C3, C4) would be satisfied by the perturbation node. The perturbation program, which is executed in response to the query, may generate a query that includes the common identifier, but rather than including the full contextual label collection of the original query, removes the last contextual label (e.g., in this case C4). The resulting query, specifying the collection of contextual labels (C1, C2, C3), may be satisfied by the yield curve node having the collection of contextual labels (C3), which would cause the yield curve program to be executed and returned to the perturbation node. The perturbation program may then perturb the generated yield curve and output the perturbed yield curve in the collection of contextual labels (C1, C2, C3, C4). This use case is not intended to be limiting. For example, a perturbation program could be used to perturb inputs to another program, along with or instead of perturbing the output of another program.

In some implementations, a contextual label may itself be associated with a parameter value. For instance, in keeping with the yield-curve use case set forth above, the C4 contextual label associated with the perturbation node may be associated with an amount of shift to be applied to the yield curve. The amount of shift may be included in the original query (e.g., specifying a collection of contextual labels (C1, C2, C3, C4 shift=20) for a shift of 20). This may facilitate avoidance of a requirement to have a plurality of different nodes including programs that shift the yield curve by different amounts.

Some contextual labels may provide functionality beyond passive labeling. An example of when a more active contextual label may be used is during a calculation that relies on temporally stale results (e.g., comparing a change in some statistic or metric between different points in time). It may not be sufficient for a program performing such a calculation to merely shift times indicating in specified temporal identifiers of queries generated by the program. This may make resolution of subsequent queries unreliable, as the result of the present calculation would include dependencies which would appear stale (e.g., because of querying for previous times which would then appear as dependencies/transitive dependencies). Such a calculation may be performed with an "active" contextual label that is pushed onto, or added to, the collection of contextual labels as a last contextual label that will cause a comparison between two times. The active contextual label may be associated with a program that dictates the components of specified temporal identifiers in queries generated as part of the calculation. This program may be included as a node in the graph, and/or indicated as a dependency of the result of the calculation. The program may facilitate the specification of an amount of time between the times, and/or may use a calendar to then identify the times that should be used in the calculation (e.g., Federal Reserve business days). The use of the active contextual label further provides an indicator that during subsequent resolutions, dependencies of the node that includes the result should be evaluated with an understanding that one set of dependencies (the set related to the calculation of for the older time) may appear stale with respect to the specified temporal identifier.

Returning to FIG. 1, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include a plurality of processing units. These processing units may be physically located within the same device, or processor 14 may represent processing functionality of a plurality of devices operating in coordination.

It should be appreciated that although modules 32, 34, 36, and 38 are illustrated in FIG. 1 as being co-located within a single processing unit, in implementations in which processor 14 includes multiple processing units, one or more of modules 32, 34, 36, and/or 38 may be located remotely from the other modules. The description of the functionality provided by the different modules 32, 34, 36, and/or 38 described below is for illustrative purposes, and is not intended to be limiting, as any of modules 32, 34, 36, and/or 38 may provide more or less functionality than is described. For example, one or more of modules 32, 34, 36, and/or 38 may be eliminated, and some or all of its functionality may be provided by other ones of modules 32, 34, 36, and/or 38. As another example, processor 14 may be configured to execute one or more additional modules that may perform some or all of the functionality attributed below to one of modules 32, 34, 36, and/or 38.

External resources 16 include resources that are external, physically and/or logically, from the other components of system 10. This may include resources controlled and/or operated by an entity separate and/or discrete from an entity operating and/or using the rest of system 10. However, this is not intended to be limiting, as the same entity may be operating and/or using both one or more of the external resources 16 and/or the one or more of the other ones of the components of system 10. By way of non-limiting example, external resources 16 may include one or more of an analytics library, an information source, and/or other resources.

Client computing platforms 18 are configured to provide access to system 10 for users. Client computing platforms 18 individually include electronic processing, storage, and/or communication resources to provide such access. Client computing platforms 18 are associated with user interfaces devices that facilitate presentation to and reception of information to and from the users. By way of non-limiting example, client computing platforms 18 may include one or more of a desktop computer, a laptop computer, a tablet, a smartphone, a handheld computer, a personal digital assistant, and/or other computing platforms.

Figure 4:
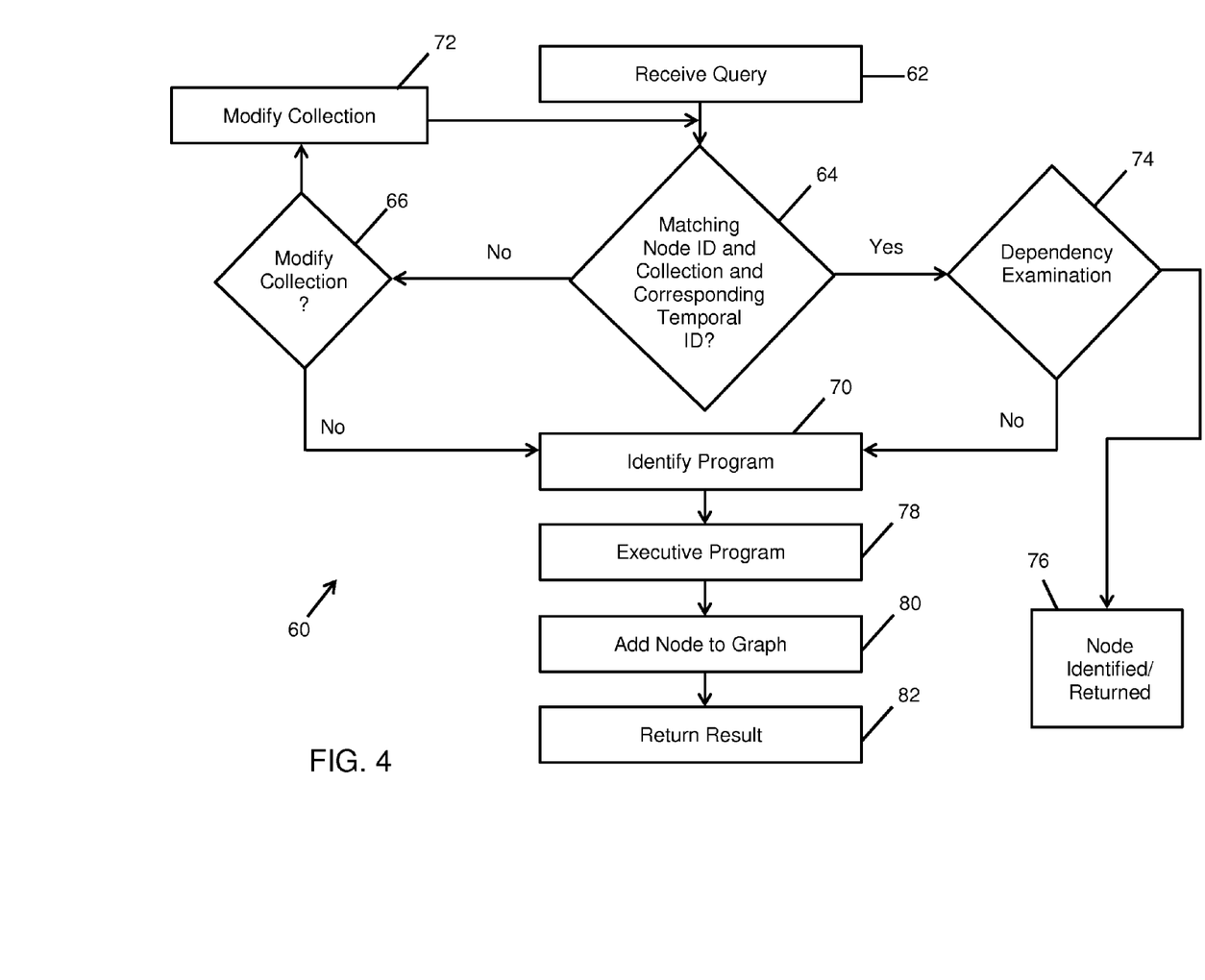
FIG. 4 illustrates a method of performing quantitative analysis.

By way of illustration, FIG. 4 depicts a method 60 of satisfying a query to a graph. The implementation of contextual labels associated with nodes in the graph to identify a node that satisfies the query may provide for various enhancements. These may include an ability to recreate previous analysis (in part or in total), to view analyze different points in time with different techniques, to update data and/or calculations previously made, and/or other enhancements. The operations of method 60 presented below are intended to be illustrative. In some embodiments, method 60 may be accomplished with one or more additional operations not described, and/or without one or more of the operations discussed. Additionally, the order in which the operations of method 60 are illustrated in FIG. 4 and described below is not intended to be limiting.

At an operation 62, a query is obtained. The query may be generated based on a user request, by execution of a program, and/or generated in other ways. The query may include specified information. The specified information may include one or more of a specified node identifier, one or more specified parameters, one or more specified parameter values, a specified contextual label collection, a specified temporal identifier, and/or other specified information. Operation 62 may be performed by a node search module the same as or similar to node search module 34 (shown in FIG. 1 and described herein).

At an operation 64, a determination is made as to whether there exists any node identified by a key having (1) components that match certain components of the specified information, and (2) a temporal identifier that corresponds to the specified temporal identifier. For example, the certain components may include one or more of a node identifier, a contextual label collection, and/or other components that match the specified information. The specified temporal identifier may represent one or more of a specified entry time, a specified relevant time, and/or other specified temporal components. An entry time included in the key of one of the nodes may correspond to a specified entry time responsive to the specified entry time coming at or after the entry time of the key of the node. This indicates that the node existed in the graph at the specified entry time. If two or more of the nodes have keys including entry times that come at or before the specified entry time, the entry time at or closest to the specified entry time may be determined as the entry time corresponding to the specified entry time. A relevant time included in a key may correspond to a specified relevant time responsive to the specified relevant time coming at or after the relevant time of the key of the node. This indicates that the node may have been relevant at the specified relevant time. If two or more of the nodes have keys including relevant times that come at or before the specified relevant time, the relevant time at or closest to the specified relevant time may be determined as the relevant time corresponding to the specified relevant time. Responsive to no node being identified by a key that includes (1) the certain components (e.g., a node identifier and a contextual label collection) that match the specified information, and (2) a temporal identifier that corresponds to the specified temporal identifier, method 60 proceeds to an operation 66. Responsive to identification of a node identified by a key including includes (1) the certain components (e.g., a node identifier and a contextual label collection) that match the specified information, and (2) a temporal identifier that corresponds to the specified temporal identifier, method 60 proceeds to an operation 74. In some implementations, operation 64 may be performed by a node search module the same as or similar to node search module 34 (shown in FIG. 1 and described herein).

At operation 66, a determination is made as to whether the specified contextual label collection should be modified in preparation for another search. This determination may be based on the contextual labels and/or the number of contextual labels in the specified contextual label collection. Responsive to a determination at operation 66 that the specified contextual label collection should not be modified (e.g., if there are no modifications or further modifications to be made), method 60 proceeds to an operation 70. Responsive to a determination at operation 66 that the specified contextual label collection should be modified, method 60 proceeds to an operation 72. In some implementations, operation 66 may be performed by a node search module the same as or similar to node search module 34 (shown in FIG. 1 and described herein).

At operation 72, the specified contextual label collection is modified, and then method 60 returns to operation 64 for a search on the modified specified contextual label collection. The modification may be performed in accordance with a routine and/or in a deterministic manner. This may mean that the modification(s) performed on the specified contextual label collection are performed in accordance with a predetermined order or routine as method 60 iterates through operations 64, 66, and 72 until it is determined at operation 64 that at least one node exists having a key that corresponds to the certain components of the specified information (including the modified specified contextual label collection), or until there are no further modifications to be performed (e.g., as determined at operation 66). The modifications to the specified contextual label collection may be performed in the following order as method 60 iterates through operations 64, 66, and 72: (i) the specified contextual label collection is modified to include only a last contextual label in the specified set of contextual labels, (ii) the specified contextual label collection is reduced to an abbreviated contextual label collection from which the last contextual label has been removed, (iii) the abbreviated contextual label collection is modified to include only a last contextual label in the abbreviated set of contextual labels, and (iv) modifications (ii) and (iii) are iterated over until there are no further modifications to be made (e.g., the contextual label collection can no longer be further abbreviated).

By way of example, for a specified contextual label collection of (C1, C2, C3, C4), successive iterations through operation 72 may result in successive queries at operation 64, assuming no matching node was found for any of the successive queries, that search for the following contextual label collections: (C1, C2, C3, C4) (this may be the initial search at operation 64); (C4); (C1, C2, C3); (C3); (C1, C2); (C2); and (C1). After a search for the last contextual label collection (C1), it may be determined at operation 66 that no further modifications are to be made, and method 60 would proceed to operation 70. In some implementations, operation 72 may be performed by a node search module the same as or similar to node search module 34 (shown in FIG. 1 and described herein).

At operation 74, a determination is made as to whether the node identified at operation 64 has dependencies on nodes with keys that include contextual label collections and temporal identifiers that are compatible with the specified contextual label collection in the query. If the node identified at operation 64 has a dependency, or a transitive dependency, to another node including a contextual label collection and/or a temporal identifier that is not compatible with the specified information, then the node identified at operation 64 does not satisfy the query, and method 60 proceeds to operation 70. If the node identified at operation 64 does not have any dependency, or transitive dependency, with a contextual label collection or temporal identifier that is not compatible with the specified information, then method 60 proceeds to an operation 76. The determination performed at operation 74 includes checking to make sure that the node identified at operation 64 does not rely (e.g., through a dependency or transitive dependency) on another node that is not compatible contextually and/or temporally with the query. In some implementations, operation 74 may be performed by a node search module the same as or similar to node search module 34 (shown in FIG. 1 and described herein). An exemplary description of the processing of dependencies and transitive dependencies performed at operation 74 is provided below with respect to FIG. 5.

At operation 76, the node identified at operation 64 is further processed and/or returned as satisfying the query received at operation 62. This may include performing further examination of the identified node and/or the graph to ensure compatibility with the original query, using the calculation object in the identified node in a subsequent calculation, presenting the calculation object in the identified node as a result satisfying the query, and/or other actions.

At operation 70, a node is identified that includes a program which will generate the result requested by the query. This identification may include modifying the query to search for nodes that include programs, and/or other operations. Responsive to no node being found that satisfies the modified query, an error message may be generated. In some implementations, operation 70 may be performed by a node search module the same as or similar to node search module 34 (shown in FIG. 1 and described herein).

At an operation 78, the program in the node identified at operation 70 is executed. Execution of the program may generate one or more additional queries to the graph. The information specified in the queries may be determined based on the specified information from the query obtained at operation 62, the values of the node including the program being executed, and/or other sources. The execution of the program generates output from the node. The output includes the result of the program, a record of the dependencies of the result produced by the program, and/or other information. The dependencies of the result produced by the program include one or more of nodes with calculation objects relied on by the program in producing the result, the node including the program that produced the result, and/or other dependencies. In some implementations, operation 78 may be performed by a program execution module the same as or similar to program execution module 36 (shown in FIG. 1 and described herein).

At an operation 80, a node is added to the graph that includes the result of the program executed at operation 78. Adding the node to the graph includes determining a key of the node, storing the node, storing the dependencies of the node (e.g., as indicated in the output of operation 78), and/or other operations. In some implementations, operation 80 is performed by a node addition module the same as or similar to node addition module 38 (shown in FIG. 1 and described herein).

At an operation 82, the result of the calculation performed by the program executed at operation 78 is returned as a response to the query.

Figure 5:
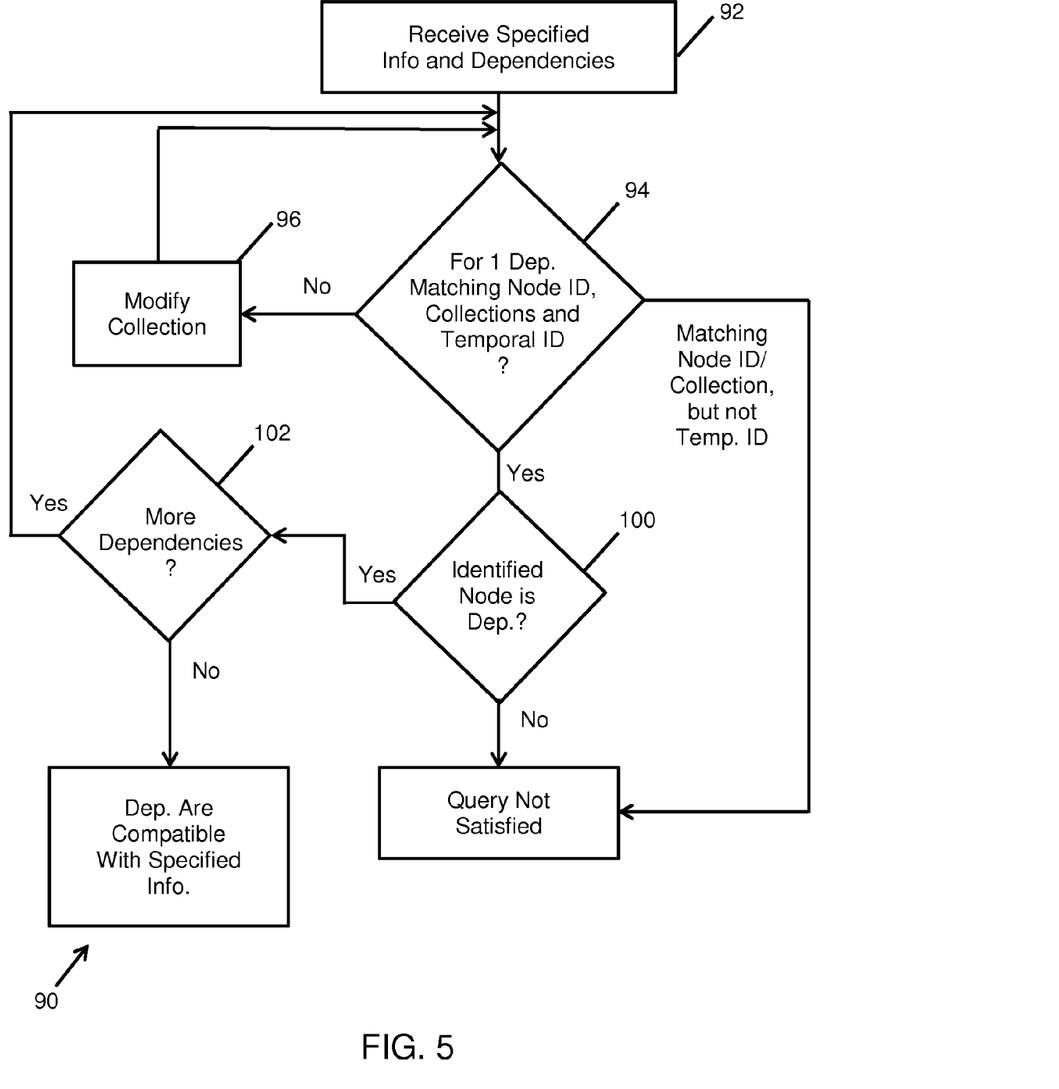
FIG. 5 illustrates a method of checking to confirm that dependency nodes of a node identified in a query to a graph are compatible with the query

FIG. 5 depicts a method 90 of checking to confirm that dependency nodes of a node identified in a query to a graph are compatible with the query. In some implementations, method 90 may be used in operation 74 of method 60 (shown in FIG. 4 and described herein). However, this is not intended to be limiting, as method 90 may be used in a variety of contexts. The operations of method 90 presented below are intended to be illustrative. In some embodiments, method 90 may be accomplished with one or more additional operations not described, and/or without one or more of the operations discussed. Additionally, the order in which the operations of method 90 are illustrated in FIG. 5 and described below is not intended to be limiting.

At an operation 92, specified information from a query, and dependency information associated with a node identified as potentially satisfying the query are received. The specified information may include, for example, a specified node identifier, a specified contextual label collection, a specified temporal identifier, and/or other specified information from the query. The dependency information may indicate and/or provide access to dependencies of the identified node. The dependency information may indicate and/or provide access to a full set of transitive dependencies for the identified node. For example, the dependency information may specify dependencies of the identified node, dependencies of the dependencies may be obtained based on this information (e.g., by accessing dependencies of the nodes on which the identified node depends), and so on.

At an operation 94, a search of the graph may be performed for a node having the full specified contextual label collection and a node identifier that matches a node identifier of a first dependency node to which the identified node has a dependency or transitive dependency, and having a temporal identifier that corresponds to the specified temporal identifier. If no node exists having the full specified contextual label collection and a node identifier that matches a node identifier of the first dependency node, and having a temporal identifier that corresponds to the specified temporal identifier, method 90 proceeds to an operation 96.

At operation 94, responsive to the contextual label collection having a last contextual label that is an active contextual label, as described above, the temporal identifier used for the purposes of operation 94 may not be the specified temporal identifier. Instead the specified temporal identifier may be shifted in accordance with the active contextual label and/or a parameter associated with the active contextual label. For simplicity, in subsequent description of FIG. 5, the term "specified temporal identifier" may refer to the specified temporal identifier of the original query, or the specified temporal identifier as shifted in accordance with the active contextual label.

At operation 96, the specified contextual label collection is modified. The modification performed at operation 96 may be the same as or similar to the modification to contextual label collection performed at operation 72 (shown in FIG. 4 and described herein). The modified contextual label collection is then used in operation 94 to re-search the graph for any node with a key having a node identifier that matches the node identifier of the first dependency node, a contextual label collection that matches the modified contextual label collection, and a temporal identifier that corresponds to the specified temporal identifier.

Operations 94 and 96 are iterated in this way until a determination is made at operation 94 that at least one node has a node identifier that matches the node identifier of the first dependency node, a contextual label collection matching the contextual label collection currently being searched (e.g., the specified contextual label collection or the contextual label collection as modified at operation 96 one or more times), and a temporal identifier that corresponds to the specified temporal identifier. Responsive to identification at operation 94 of a node with a key having a node identifier that matches the node identifier of the first dependency node, a contextual label collection that matches the modified contextual label collection, and a temporal identifier that corresponds to the specified temporal identifier, method 90 proceeds to an operation 100.

At operation 100, a determination is made as to whether the node identified at operation 94 is the first dependency node. If the node identified at operation 94 is not the first dependency node, then there is a node having the same node identifier as the first dependency node and a contextual label collection and/or temporal identifier that corresponds more closely to the specified information of the original query than the contextual label collection and/or temporal identifier of the first dependency node. As such, the node that was previously identified as potentially satisfying the original query does not actually satisfy the query. If the node identified at operation 94 is the first dependency node, then method 90 proceeds to an operation 102.

At operation 102, a determination is made as to whether there are any further nodes on which the node identified as potentially satisfying the query has a dependency or transitive dependency. Responsive to there being a further dependency, for example to a second dependency node, method 90 returns to operation 94 and iterates over operations 94, 96, and/or 100 for the further dependent node. Response to a determination at operation 102 that there are not further dependencies to assess, the node identified as potentially satisfying the query is confirmed as having dependencies with contextual label collections that are compatible with the specified contextual label collection in the original query.

Figure 6:
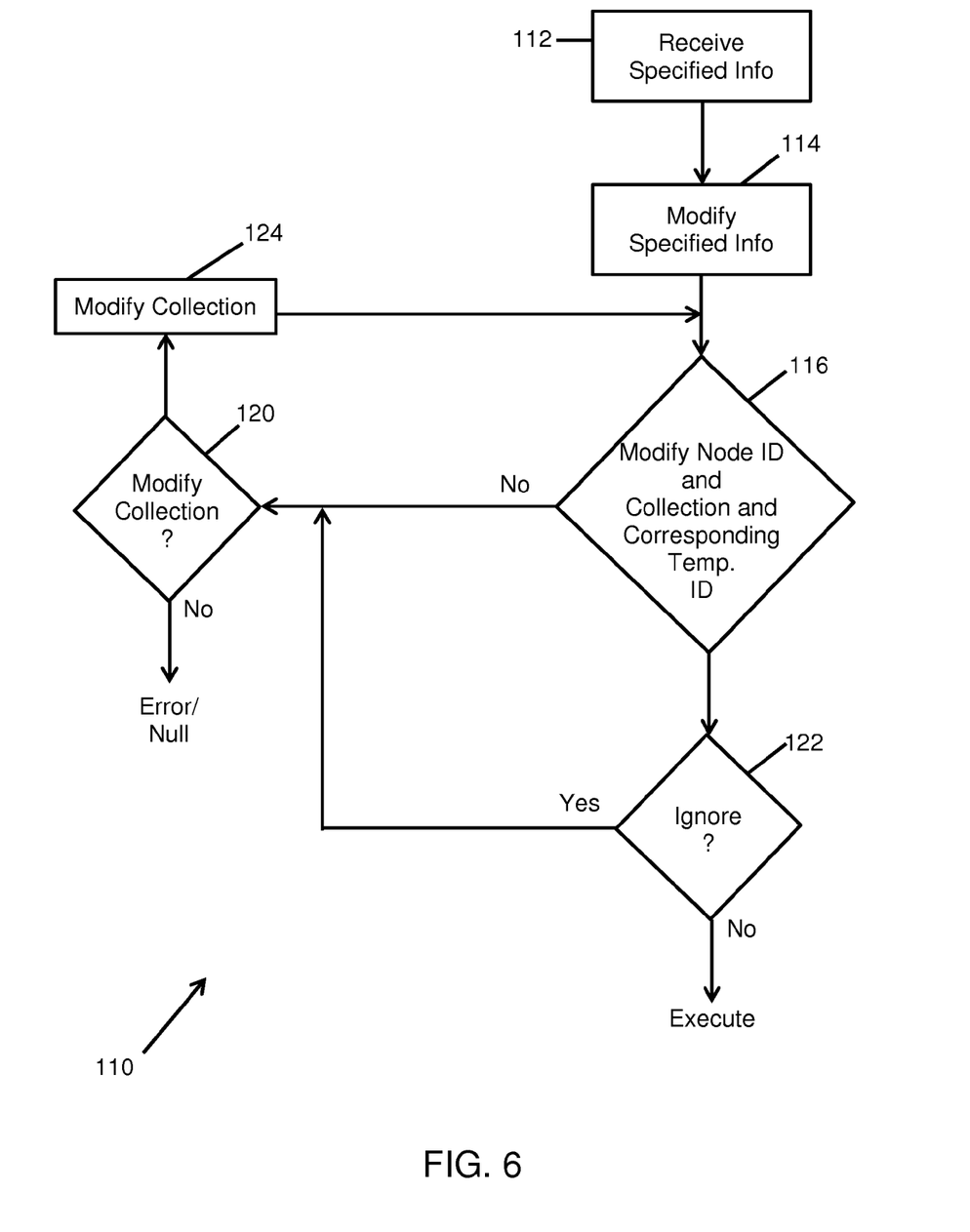
FIG. 6 illustrates a method of discovering and executing a program in a node satisfying a query.

FIG. 6 depicts a method 110 of discovering and executing a program in a node satisfying the query. In some implementations, method 110 may be used in operation 70 of method 60 (shown in FIG. 4 and described herein). However, this is not intended to be limiting, as method 110 may be used in a variety of contexts. The operations of method 110 presented below are intended to be illustrative. In some embodiments, method 110 may be accomplished with one or more additional operations not described, and/or without one or more of the operations discussed. Additionally, the order in which the operations of method 110 are illustrated in FIG. 6 and described below is not intended to be limiting.

At an operation 112, specified information from a query is received. The specified information may include, for example, a specified node identifier, a specified contextual label collection and/or other specified information from the query.

At an operation 114, the specified information may be modified to search for a node that includes a calculation object that will produce a result requested by the query, rather than a node that includes the actual result. This modification may include one or more of modifying the node identifier, modifying parameters and/or parameter values included in the specified information, and/or other modifications.

At an operation 116, a determination is made as to whether any node exists identified by a key having (1) components that match certain components of the specified information, as modified at operation 114, and (2) a temporal identifier that corresponds to the specified temporal identifier. For example, the certain components may include one or more of a node identifier, a contextual label collection, and/or other components that match the specified information as modified at operation 114. Responsive to no node being identified by a key that includes (1) the certain components of the specified information (e.g., a node identifier and a contextual label collection that match the specified information (as modified)), and (2) a temporal identifier corresponding to the specified temporal identifier, method 110 proceeds to an operation 120. Responsive to determination that a node exists identified by a key that includes (1) the certain components of the specified information (e.g., a node identifier and a contextual label collection that match the specified information (as modified)), and (2) a temporal identifier corresponding to the specified temporal identifier, method 110 proceeds to an operation 122.

At operation 122, a determination is made as to whether the node identified at operation 116 should be ignored by the search. The filter may specify whether the program included in the identified node should be executed when queried with the rest of the specified information. For example, for a given contextual label (or contextual label collection), a given parameter (or collection of parameters), a given parameter value (or collection of parameter values), other specified information, or combination of the foregoing, the filter may specify that the program included in the identified node should be ignored. By way of example, a program that adjusts the price of all of the stocks in a particular sector (e.g., technology) may be associated with a filter that causes stocks outside of the particular sector (e.g., non-technology stocks) to be ignored.

Returning, for illustrative purposes, to the description of a yield curve node and a perturbation node provided above, the perturbation node may be configured to request separate yield curves for a variety of different securities, and to shift some subset of the yield curves (e.g., securities issued by European governments). The perturbation node may include (or query another node including a filter program including) a filter specifying the subset for which the yield curves should be shifted, and that the other yield curves should not be shifted. A query satisfied by the perturbation node would result in the generation of queries satisfied by the yield curve node, with the yield curve script generating the set of yield curves and returning them to the perturbation node. The filter program would apply a filter to indicate which yield curves should be shifted, and the perturbation program would shift the appropriate subset of the yield curves, while taking no further action with respect to the other yield curves. The entire set of yield curves, including the now shifted subset of yield curves would then be provided as the output of the perturbation node.

In some implementations, the filter program might return a closure (e.g., a function, embedding computed data) that performs the actual filtering. To continue the example, the filter program might read a mapping node that contains mappings of currency identifiers to countries and regions, and from this generate a function that "hard codes" the list of applicable currencies, so the mapping node doesn't have to be repeatedly read. One implementation is that the closure takes the form of a regex, for example, "EURIGBPISEK", and so on.

Responsive to a determination that the node identified at operation 116 should not be ignored, method 110 provides the node for execution. Responsive to a determination that the node identified at operation 116 should be ignored, method 110 proceeds to an operation 120.

At operation 120, a determination is made as to whether the specified contextual label collection should be modified in preparation for another search. This determination may be based on the contextual labels and/or the number of contextual labels in the specified contextual label collection. Responsive to a determination at operation 120 that the specified contextual label collection should be modified, method 110 proceeds to an operation 122. Responsive to a determination at operation 120 that the specified contextual label collection should not be modified (e.g., if there are no modifications or further modifications to be made), there may not be a node that satisfies the query. This may result in an error message, or some other communication with the user that the query has not been satisfied.

At operation 124, the specified contextual label collection is modified. The modification performed at operation 124 may be the same as or similar to the modification to contextual label collection performed at operation 72 (shown in FIG. 4 and described herein). The modified contextual label collection is then used in operation 116 to re-search the graph for any node having a node identifier that matches the specified node identifier (or the modified node identifier), and having a contextual label collection that matches the modified contextual label collection. Operations 116, 120, 122, and/or 124 are iterated in this way until a node is identified at operation 116 as being identified by a key that includes the certain components of the specified information, and includes a temporal identifier that corresponds to the specified temporal identifier, and that is not ignored at operation 122.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to perform quantitative analysis, the system comprising:
   a computer system comprising one or more physical processors programmed to execute computer program instructions which, when executed, cause the computer system to:
   store, in non-transitory storage media, a graph comprising nodes, wherein the graph nodes comprise nodes representing programs configured for obtaining a result to satisfy a query;
   obtain a first query and, responsive to the first query, effectuate a first search of the graph for a node representing a first program to be used to obtain a first result that satisfies the first query;
   responsive to the first search identifying a first node of the graph nodes that represents the first program, provide information related to the first query to the first program;
   responsive to providing the information related to the first query, obtain a second query from the first program, wherein the second query is for a second program to be used to obtain the first result;
   responsive to the second query, effectuate a second search of the graph for a node representing the second program;
   responsive to the second search identifying a second node of the graph nodes that represents the second program, provide information related to the second program to the first program; and
   obtain, from the first program, the first result responsive to providing the information related to the second program.

2. The system of claim 1, wherein the computer system is further caused to:
   responsive to providing the information related to the first query, obtain a third query from the first program, wherein the third query is for a third program to be used to obtain the first result;
   responsive to the third query, effectuate a third search of the graph for a node representing the third program; and
   responsive to the third search identifying a third node of the graph nodes that represents the third program, provide information related to the third program to the first program,
   wherein the first result is obtained from the first program responsive to providing the information related to the second program and the third program.

3. The system of claim 2, wherein, responsive to providing the information related to the second program and the third program, the first program:
   (i) provides information related to calculating the first result to the second program and obtains a first output from the second program that is calculated based on the information related to calculating the first result; and
   (ii) provides a version of the first output to the third program and obtains a second output from the third program that is calculated based on the version of the first output,
   wherein the first result is obtained from the first program based on the second output.

4. The system of claim 3, wherein the computer system is further caused to:
  obtain, from the first program, the information related to calculating the first result;
  provide, to the second program, the information related to calculating the first result;
  obtain the first output from the second program;
  provide the first output to the first program;
  obtain the version of the first output from the first program;
  provide, to the third program, the version of the first output;
  obtain the second output from the third program; and
  provide the second output to the first program.

5. The system of claim 1, wherein, responsive to providing the information related to the second program, the first program provides information related to calculating the first result to the second program and obtains a first output from the second program that is calculated based on the information related to calculating the first result, and
  wherein the first result is obtained from the first program based on the first output.

6. The system of claim 5, wherein the first program calculates the first result based on the first output.

7. The system of claim 1, wherein the first query specifies at least a first set of contextual labels as criteria for the first query,
  wherein the first program generates, based on the first set of contextual labels, the second query to specify at least a second set of contextual labels as criteria for the second query such that the second set of contextual labels includes at least one contextual label of the first set of contextual labels and do not include at least one contextual label of the first set of contextual labels.

8. The system of claim 7, wherein the first set of contextual labels includes all of the contextual labels of the second set of contextual labels.

9. The system of claim 7, wherein the computer system is further caused to:
  effectuate a first comparison of the first set of contextual labels with one or more sets of contextual labels of the graph nodes, wherein the first search is based on the first comparison; and
  effectuate a second comparison of the second set of contextual labels with one or more sets of contextual labels of the graph nodes, wherein the second search is based on the second comparison.

10. The system of claim 1, wherein the computer system is further caused to:
  provide the first result as a response to the first query.

11. The system of claim 1, wherein edges in the graph represent dependencies between the graph nodes, wherein a node of the graph depends from another node when the other node is used to create the dependent node, and wherein the first search comprises a traversal of the graph based on the dependencies between the graph nodes.

12. The system of claim 11, wherein the computer system is further caused to:
  store, in the non-transitory storage media as part of the graph, a new node that represents the first result; and
  assign the first node as a dependency of the new node based on the first program represented by the first node being used to obtain the first result.

13. The system of claim 12, wherein the computer system is further caused to:
  assign the second node as a dependency of the new node based on the second program represented by the second node being used to obtain the first result.

14. The system of claim 12, wherein the computer system is further caused to:
  obtain, subsequent to the storage of the new node, a subsequent query and, responsive to the subsequent query, effectuate a subsequent search of the graph for a node representing a previously-calculated result that satisfies the subsequent query; and
  provide the first result as a response to the subsequent query responsive to the subsequent search identifying the new node as a node representing a previously-calculated result that satisfies the subsequent query.

15. A computer-implemented method of performing quantitative analysis, the method being implemented on a computer system that includes one or more physical processors executing computer program instructions which, when executed, perform the method, the method comprising:
  storing, by the computer system, in non-transitory storage media, a graph comprising nodes, wherein the graph nodes comprise nodes representing programs configured for obtaining a result to satisfy a query;
  obtaining, by the computer system, a first query and, responsive to the first query, effectuate a first search of the graph for a node representing a first program to be used to obtain a first result that satisfies the first query;
  responsive to the first search identifying a first node of the graph nodes that represents the first program, providing, by the computer system, information related to the first query to the first program;
  responsive to providing the information related to the first query, obtaining, by the computer system, a second query from the first program, wherein the second query is for a second program to be used to obtain the first result;
  responsive to the second query, effectuating, by the computer system, a second search of the graph for a node representing the second program;
  responsive to the second search identifying a second node of the graph nodes that represents the second program, providing, by the computer system, information related to the second program to the first program; and
  obtaining, by the computer system, from the first program, the first result responsive to providing the information related to the second program.

16. The method of claim 15, further comprising:
  responsive to providing the information related to the first query, obtaining, by the computer system, a third query from the first program, wherein the third query is for a third program to be used to obtain the first result;
  responsive to the third query, effectuating, by the computer system, a third search of the graph for a node representing the third program; and
  responsive to the third search identifying a third node of the graph nodes that represents the third program, providing, by the computer system, information related to the third program to the first program,
  wherein the first result is obtained from the first program responsive to providing the information related to the second program and the third program.

17. The method of claim 16, wherein, responsive to providing the information related to the second program and the third program, the first program:
  (i) provides information related to calculating the first result to the second program and obtains a first output from the second program that is calculated based on the information related to calculating the first result; and (ii) provides a version of the first output to the third program and obtains a second output from the third program that is calculated based on the version of the first output, wherein the first result is obtained from the first program based on the second output.

18. The method of claim 16, further comprising:
obtaining, by the computer system, from the first program, the information related to calculating the first result;
providing, by the computer system, to the second program, the information related to calculating the first result;
obtaining, by the computer system, the first output from the second program;
providing, by the computer system, the first output to the first program;
obtaining, by the computer system, the version of the first output from the first program;
providing, by the computer system, to the third program, the version of the first output;
obtaining, by the computer system, the second output from the third program; and
providing, by the computer system, the second output to the first program.

19. The method of claim 15, wherein, responsive to providing the information related to the second program, the first program provides information related to calculating the first result to the second program and obtains a first output from the second program that is calculated based on the information related to calculating the first result, and
wherein the first result is obtained from the first program based on the first output.

20. The method of claim 19, wherein the first program calculates the first result based on the first output.

21. The method of claim 15, wherein the first query specifies at least a first set of contextual labels as criteria for the first query,
wherein the first program generates, based on the first set of contextual labels, the second query to specify at least a second set of contextual labels as criteria for the second query such that the second set of contextual labels includes at least one contextual label of the first set of contextual labels and do not include at least one contextual label of the first set of contextual labels.

22. The method of claim 21, wherein the first set of contextual labels includes all of the contextual labels of the second set of contextual labels.

23. The method of claim 21, further comprising:
effectuating, by the computer system, a first comparison of the first set of contextual labels with one or more sets of contextual labels of the graph nodes, wherein the first search is based on the first comparison; and
effectuating, by the computer system, a second comparison of the second set of contextual labels with one or more sets of contextual labels of the graph nodes, wherein the second search is based on the second comparison.

24. The method of claim 15, further comprising:
providing, by the computer system, the first result as a response to the first query.

25. The method of claim 15, wherein edges in the graph represent dependencies between the graph nodes, wherein a node of the graph depends from another node when the other node is used to create the dependent node, and wherein the first search comprises a traversal of the graph based on the dependencies between the graph nodes.

26. The method of claim 25, further comprising:
storing, by the computer system, in the non-transitory storage media as part of the graph, a new node that represents the first result; and
assigning, by the computer system, the first node as a dependency of the new node based on the first program represented by the first node being used to obtain the first result.

27. The method of claim 26, further comprising:
assigning, by the computer system, the second node as a dependency of the new node based on the second program represented by the second node being used to obtain the first result.

28. The method of claim 26, further comprising:
obtaining, by the computer system, subsequent to the storage of the new node, a subsequent query and, responsive to the subsequent query, effectuate a subsequent search of the graph for a node representing a previously-calculated result that satisfies the subsequent query; and
providing, by the computer system, the first result as a response to the subsequent query responsive to the subsequent search identifying the new node as a node representing a previously-calculated result that satisfies the subsequent query.

* * * * *